United States Patent [19]

Adams et al.

[11] Patent Number: 5,688,022
[45] Date of Patent: Nov. 18, 1997

[54] MODULAR PANEL ASSEMBLY

[75] Inventors: Edward R. Adams, Spring Lake; Douglas C. Ruch, Zeeland, both of Mich.

[73] Assignee: Donnelly Corporation, Holland, Mich.

[21] Appl. No.: 681,316

[22] Filed: Jul. 22, 1996

Related U.S. Application Data

[63] Continuation of Ser. No. 312,820, Sep. 27, 1994, abandoned.

[51] Int. Cl.⁶ .................................................. B60R 13/02
[52] U.S. Cl. .......................... 296/214; 206/335; 206/386
[58] Field of Search ........................... 312/820; 296/214, 296/39.1; 280/79.3; 206/335, 560, 562, 564, 386

[56] References Cited

U.S. PATENT DOCUMENTS

| | | | |
|---|---|---|---|
| 2,936,899 | 5/1960 | Tashman | 280/79.3 X |
| 3,170,571 | 2/1965 | Knapp et al. | 206/564 |
| 3,610,429 | 10/1971 | MacKay | 280/79.3 X |
| 3,963,125 | 6/1976 | Baggott | 280/79.3 X |
| 4,553,309 | 11/1985 | Hess et al. | 29/450 |
| 4,610,478 | 9/1986 | Tervol | 296/214 |
| 4,728,383 | 3/1988 | Kaller et al. | 296/214 X |
| 4,731,151 | 3/1988 | Kaller et al. | 296/214 X |
| 4,830,191 | 5/1989 | Dijksman | 206/386 X |
| 4,840,832 | 6/1989 | Weinle et al. | 296/39.1 X |
| 4,844,533 | 7/1989 | Dowd et al. | 296/214 |
| 4,893,866 | 1/1990 | Dowd et al. | 296/214 |
| 4,893,867 | 1/1990 | Hilborn et al. | 296/214 |
| 4,902,068 | 2/1990 | Dowd et al. | 296/214 |
| 4,913,484 | 4/1990 | Dowd et al. | 296/97.12 |
| 4,921,100 | 5/1990 | Krause | 206/448 |
| 4,921,101 | 5/1990 | Gatt | 206/451 |
| 4,981,323 | 1/1991 | Dowd et al. | 296/214 |
| 5,011,011 | 4/1991 | Kidd | 206/319 |
| 5,011,218 | 4/1991 | Danner et al. | 296/214 |
| 5,082,323 | 1/1992 | Dowd et al. | 296/214 |
| 5,086,920 | 2/1992 | Binienda | 206/335 |
| 5,105,521 | 4/1992 | Dowd et al. | 296/214 X |
| 5,269,060 | 12/1993 | Dowd et al. | 296/214 X |
| 5,280,991 | 1/1994 | Weiland | 296/214 |
| 5,368,156 | 11/1994 | Bruzzi et al. | 206/564 |
| 5,403,064 | 4/1995 | Mahler et al. | 296/214 |

FOREIGN PATENT DOCUMENTS

| | | | |
|---|---|---|---|
| 0 170 086 | 3/1985 | European Pat. Off. . | |
| 0 346 155 | 12/1989 | European Pat. Off. . | |
| 2526758 | 11/1983 | France | 206/386 |
| 2654057 | 5/1991 | France | 280/79.3 |
| 40 05 884 | 2/1990 | Germany . | |
| 282053 | 11/1989 | Japan | 296/214 |
| 2243121 | 10/1991 | United Kingdom | 29/897.2 |

*Primary Examiner*—Dennis H. Pedder
*Attorney, Agent, or Firm*—Varnum, Riddering, Schmidt & Howlett LLP

[57] ABSTRACT

A headliner for a vehicle is formed with accessories having clips for mounting the accessories and the headliner to the roof of a vehicle. The headliner is received within a tray that supports the headliner during shipping from the headliner manufacturing plant to the vehicle assembly plant. The tray further provides support for the headliner during installation of the headliner into the vehicle. Thus, the headliner can be manufactured without structural supports reinforced areas because the headliner is structurally supported by the tray during shipping and installation.

19 Claims, 5 Drawing Sheets

MODULAR PANEL ASSEMBLY

This is a continuation of application Ser. No. 08/312,820 filed Sep. 27, 1994, now abandoned.

BACKGROUND OF THE INVENTION

1. Field of the Invention

This invention relates to a modular panel assembly and method of assembling a panel to a frame, and more specifically to a headliner and tray assembly and to a method for installing the headliner into a vehicle.

2. State of the Prior Art

Headliners are commonly used in many different types of vehicles. Typically, a headliner for a vehicle is mounted within the passenger compartment of a vehicle to the vehicle roof. The headliner forms an acoustical liner for the interior of the vehicle. Headliners also add to the aesthetic appearance of the vehicle and are often manufactured with a compartment facing surface of a finish material. Various accessories, such as grab handles, dome lamps, visors and clothing hooks can be incorporated into the headliner.

The headliner can be manufactured from a variety of relatively light materials, including fiberglass, polyester batting, compressed fiberboard and semirigid foam. Unfortunately, such nonstructural materials make it difficult to install the headliner within the vehicle because the headliner is subject to bending, warping, and other physical changes because of the inability of the lightweight material to support itself and/or attached accessories. Headliners also are susceptible to damage during shipping because the headliner is made from relatively lightweight and deformable material. A solution to the lack of structural support during installation and damage during shipping is to manufacture the headliner with structural members and/or reinforced areas. The structural members and the reinforced areas give the headliner structural support to aid in assembling the headliner within the vehicle and prevent damage during shipping. Unfortunately, the addition of structural members or reinforced areas to the headliners adds unwanted weight to the headliner while increasing the cost of the headliner and intrusion into the vehicle compartment.

Other automotive panels may face the same problems of shipment, assembly and installation. Panel assembly in other industries such as aircraft and furniture industry may also face the same or similar problems.

SUMMARY OF THE INVENTION

In accordance with the invention, a modular panel is formed of a substantially planar sheet of deformable material and is adapted to be mounted to a structural frame such as the interior of a vehicle frame. The planar sheet has an upper surface adapted to face the frame when the modular panel is mounted to the frame. The planar sheet further has accessories attached thereto in a position accessible from a lower surface of the planar sheet. A support tray comprises an upper surface shaped to complement and support the lower surface of the planar sheet to retain the planar sheet on the tray. The modular panel and the tray can be installed in the frame as a unit by inserting the modular panel and support tray into or onto the frame as a unit, securing the panel to the frame and subsequently removing the support tray from the frame and from the panel.

Preferably, a carrier is provided for the support tray and modular panel. The carrier has supports for holding multiple sets of modular panels and support trays in a prearranged orientation whereby multiple sets of modular panels and support tray assemblies can be shipped in a predetermined condition. Further, the tray has recesses in the upper surface thereof. Accessories are received in the recesses and are secured to the modular panel.

The invention further relates to modular headliners and a support assembly comprising a support tray and a carrier. The modular headliner comprises a substantially planar sheet of fragile material that is adapted to be mounted beneath a roof of a vehicle. The planar sheet has an upper surface adapted to face a roof of a vehicle and a lower surface adapted to face an interior of a vehicle. Accessories can be mounted to the planar sheet in a position accessible from the interior of the vehicle. The support tray has an upper surface shaped to complement and support the lower surface of the modular headliner and to retain the modular headliner on the support tray. The modular headliner and tray can be shipped as a unit and installed in a vehicle by inserting a modular headliner and support tray into the vehicle as a unit, at least temporarily fixing the modular headliner to the roof of the vehicle and subsequently removing the support tray from the vehicle.

Preferably, the modular headliner and support assembly further comprises a carrier for the support tray so that multiple sets of the modular headliners and support trays can be shipped in a horizontal position. The carrier can have a top wall, bottom wall and opposed side walls to define a support tray chamber for receiving the support tray. The walls can be contiguous or defined by the structural outline of the chamber. The opposed side walls have rails on which the support trays are supported.

Alternatively, the tray can have stacking elements which permit the headliner and tray assemblies to be stacked on top of one another and moved on a skid or pallet.

The support tray can have locators at the sides of the support tray for locating the support tray with respect to the vehicle for proper positioning of the modular headliner within the vehicle and further for retaining the modular headliner on the tray during shipping and placement of the modular headliner in the vehicle. The support tray also can have recesses in the upper surface for receiving the accessories of the modular headliner to retain the headliner and accessories in position on the tray during shipping and to facilitate placement and retention of the modular headliner in the vehicle. Handles can be mounted to or integral with the periphery of the support tray for lifting and moving the support tray. A coupling or registration feature on the bottom surface of the support tray can be used to connect the support tray to a manual or robotic arm for assembling the modular headliner to a vehicle.

Further according to the invention, a method of assembling a subassembly to a structural frame comprises the steps of forming a tray with an upper surface contour which conforms substantially to a contour of a subassembly, placing assembled components of the subassembly on the upper surface of the tray in an orientation wherein the upper portion of the subassembly assumes a predetermined relationship to a structural frame, placing the subassembly in the predetermined relationship to the frame while the supporting subassembly is on the tray and at least temporarily fixing the subassembly in position within the frame while the tray supports the subassembly. The tray is subsequently removed from the subassembly and from the frame. Preferably, at least some of the subassembly components are assembled together before placing the components on the support tray.

In a preferred embodiment of the invention, the step of placing the assembled components on the tray is conducted at a first location and the step of placing the subassembly in the predetermined relationship to the frame is conducted at a second location different from the first location. Further, multiple sets of subassemblies and trays are assembled onto a carrier and the carrier with the multiple sets is transported from the first location to the second location subsequent to the step of placing the assembled components of the subassembly on the upper surface of the tray but prior to the step of placing the subassembly in the predetermined relationship to the frame for assembly thereto.

In another aspect of the invention, the modular headliner is assembled within a vehicle by forming a headliner having a shape of a vehicle interior roof and laying the headliner on a support tray having a shape that conforms to the shape of the headliner so that the headliner is supported and retained by the tray. The tray and headliner are placed as a unit in the vehicle to position the headliner against the roof of a vehicle in a predetermined position. The headliner is at least temporarily attached to the vehicle in the predetermined position within the vehicle. The tray is then removed from the vehicle.

Preferably, accessories are mounted to the headliner after the laying of the modular headliner on the support tray and the headliner is positioned horizontally on the support tray. The support tray is shaped to conform to the shape of the accessories as well as the modular headliner. The modular headliner is assembled in position in the vehicle by a robotic arm, mechanical arm or manual labor.

The modular headliner can be formed in a first location and the vehicle can be assembled in a second location. Multiple support trays with modular headliners can be stacked in a carrier at the first location and transported to the second location for assembly into the vehicle. The support tray can then be returned to the first location for reuse in transporting other modular headliners from the first location to the vehicle.

BRIEF DESCRIPTION OF THE DRAWINGS

The invention will now be described with reference to the accompanying drawings, in which.

DESCRIPTION OF THE PREFERRED EMBODIMENT

Figure 1:
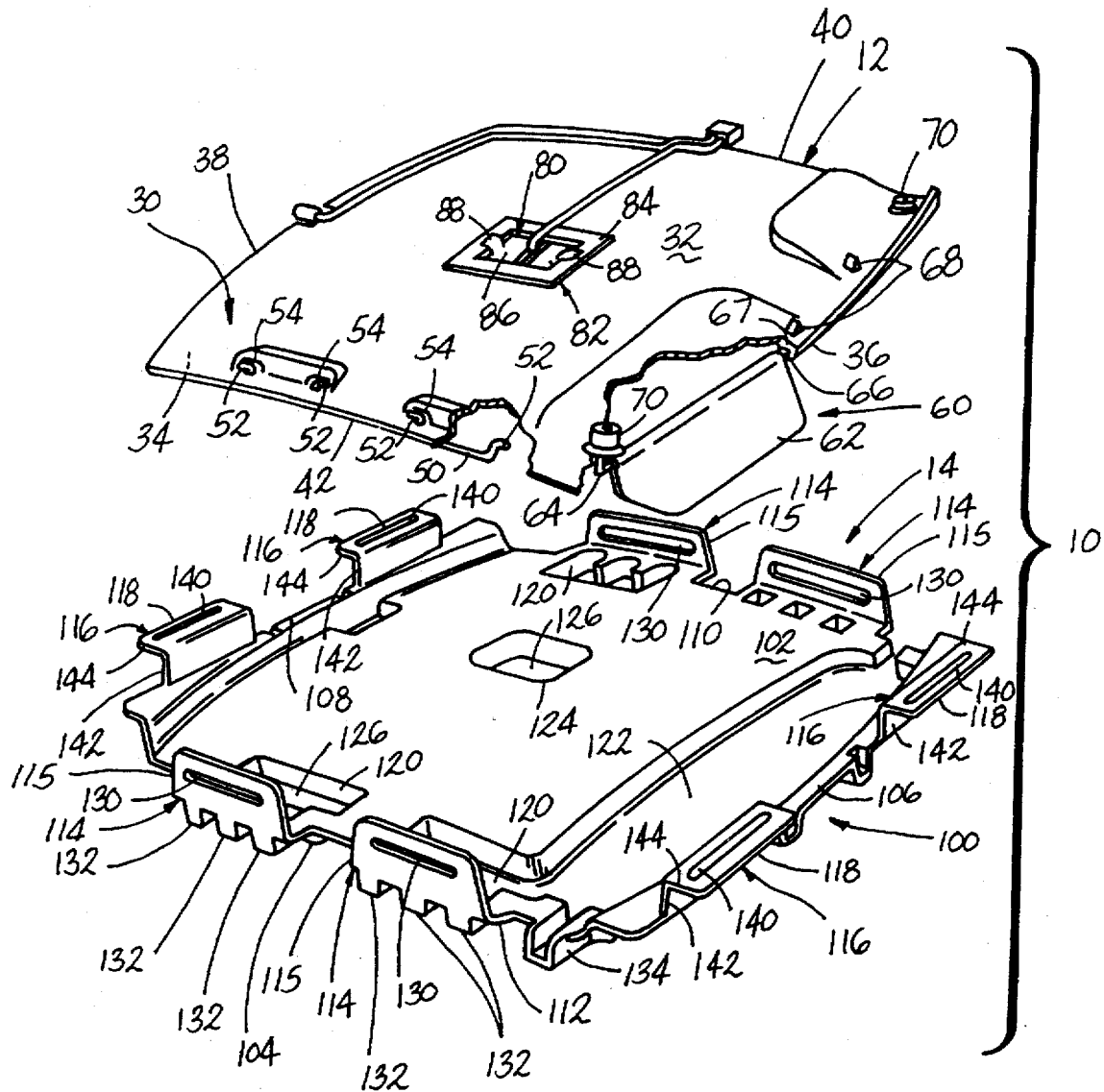
FIG. 1 perspective view partially broken away, of the modular headliner according to the invention.

FIG. 1 illustrates a modular headliner system 10, which is a preferred embodiment of the invention. The modular headliner system 10 comprises a modular headliner assembly 12, a tray assembly 14 and a carrier assembly 16. The modular headliner assembly 12 is received within the tray assembly 14, which supports and protects the modular headliner assembly 12 during shipping and/or installation of the headliner assembly 12. Generally, one or more of the modular headliner assemblies 12 and tray assemblies 14 are shipped in the carrier assembly 16. The tray assembly 14 aids in installing the headliner assembly 12 to a roof 20 of a vehicle 18.

The headliner assembly 12 comprises a headliner 30, preferably made from fiberglass, semirigid urethane foam or other formable material. Other materials such as corrugated paperboard, resinated cotton and matted recycled PET fibers can also be used to make a suitable headliner. The headliner 30 has an upper surface 32 and a lower surface 34. The upper surface abuts the roof 20 of the vehicle 18 when the headliner 30 is installed within the vehicle 18. The lower surface 34 preferably has a decorative surface to augment the aesthetic appearance of the interior of the vehicle 18. The headliner generally conforms to the shape of the vehicle roof and has a perimeter defined by a front edge 36, rear edge 38, left side edge 40, and right side edge 42. When mounted within a vehicle, the left side edge corresponds to the driver side of the vehicle, the right side edge corresponds to the passenger side of the vehicle.

Multiple accessories can be mounted to or formed within the headliner 30. Examples of such accessories are grab handles, lights, visors, clothing hooks and mirror mounts, etc. Grab handles 50 are disposed along the edges of the headliner 30, preferably along the left side edge 40 and the right side edge 42. The number of grab handles 50 usually correspond to the number of doors in the vehicle 18 so that a person entering and exiting the vehicle can use the grab handle 50 to assist their exit and entrance. The grab handles 50 have clips 52, which are inserted through slots 54 in the headliner 30. The clips 52 are also used to attach the grab handles 50 and the headliner 30 to the roof of the vehicle 18 by inserting the clips 52 into corresponding slots (not shown) in the vehicle 18. Screws (not shown) can also be used to securely fasten the accessories to the vehicle.

Visors 60 are mounted adjacent an edge of the headliner 30, preferably the front edge 36, which is adjacent the front windshield when the headliner 30 is mounted within the vehicle 18. The visors 60 comprise a panel 62 mounted to an arm 64, which is pivotally mounted to a visor bracket 70. The visor 60 is mounted to the headliner 30 by inserting the arm 64 through an opening (not shown) in the headliner and into the visor bracket 70 disposed on the upper surface 32 of the headliner 30. The panel 62 also has a stub 66 which is received within a visor lock 67 having a clip 68 to mount the visor lock to the headliner 30.

The headliner 30 can also mount a light assembly 80. The light assembly 80 is preferably mounted within an aperture 82 in the headliner 30 and centrally disposed with respect to the headliner 30. The light assembly 80 comprises a frame 84 and a light 86. The frame 84 has an aperture 85 and is disposed on the upper surface 32 of the headliner 30 so the frame aperture 85 aligns with the headliner aperture 82 and the light 86 is disposed within the headliner aperture 82 and has fasteners 88 that pass through the aligned apertures and mount over the frame 84 to compress the headliner 30 between the frame 84 and the light 86 to mount the light assembly 80 to the headliner 30. The light assembly can mount in a variety of ways to the headliner other than the described method.

The tray assembly 14 comprises a tray 100 having an upper surface 102 and a lower surface 104. The tray 100 is preferably made from a structurally rigid material such as ABS, polyethylene or polypropylene. Preferably, the tray is vacuum formed. The tray has a perimeter defined by a front edge 106, rear edge 108, left side edge 110, and right side edge 112 that coincide with the front edge 36, rear edge 38, left side edge 40 and right side edge 42, respectively, of the headliner 30 when the headliner 30 is placed on the tray 100. Locators 114 are disposed along the left side edge 110 and right side edge 112. Handles 116 extend from the front edge 106 and rear edge 108.

The upper surface 102 of the tray 100 has multiple recesses formed therein. The multiple recesses preferably correspond to the accessories mounted on the headliner 30. These recesses can have openings 126 to provide access openings for assembly of the headliner to a vehicle. Grab handle recesses 120 are formed in the upper surface 102 of the tray to receive the grab handles 50 when the headliner 30 is placed on the tray 100. Similarly, a visor recess 122 is formed adjacent the front edge 106 of the tray 100 to receive the visors 60 of the headliner 30. A light assembly recess 124 receives the light assembly 80.

The upper surface 102 of the tray 100 is generally shaped to complement the lower surface 34 of the headliner 30 and any accessories (grab handles 50, visor 60, light assemblies 80) mounted thereto. The complementary relationship between the tray 100 and the headliner 30 functions to retain the headliner 30 in a predetermined relationship with respect to the tray 100 during shipment and up to installation into the vehicle. This predetermined relationship is important in not only protecting the headliner during shipment but also in accurate placement of the headliner in the vehicle with robotic equipment, or even manually, as will be described hereinafter.

The locators 114 have an aperture 130, which define a handle 115 on the locators 114. The locators 114 also have one or more blocks 132, which are used to support the tray when it is mounted in the carrier assembly 16. Similarly, the tray 100 can be formed with tray blocks 134, which are also used to support the tray 100 when it is mounted within the carrier assembly 16 and for structural support of the tray 100.

The handles 116, like the locators 114, have an aperture 140 that define a handle grip 118. Preferably, the handles 116 are L-shaped in cross section and have a vertical member 142 and a horizontal member 144 with the aperture 140 passing through it.

The handles 116 and the locators 114 provide lateral restraint for the headliner and also tend to retain the headliner in a predetermined relationship with respect to the tray 100. They can be integrally formed with the tray or attached separately to the tray.

Figure 3:
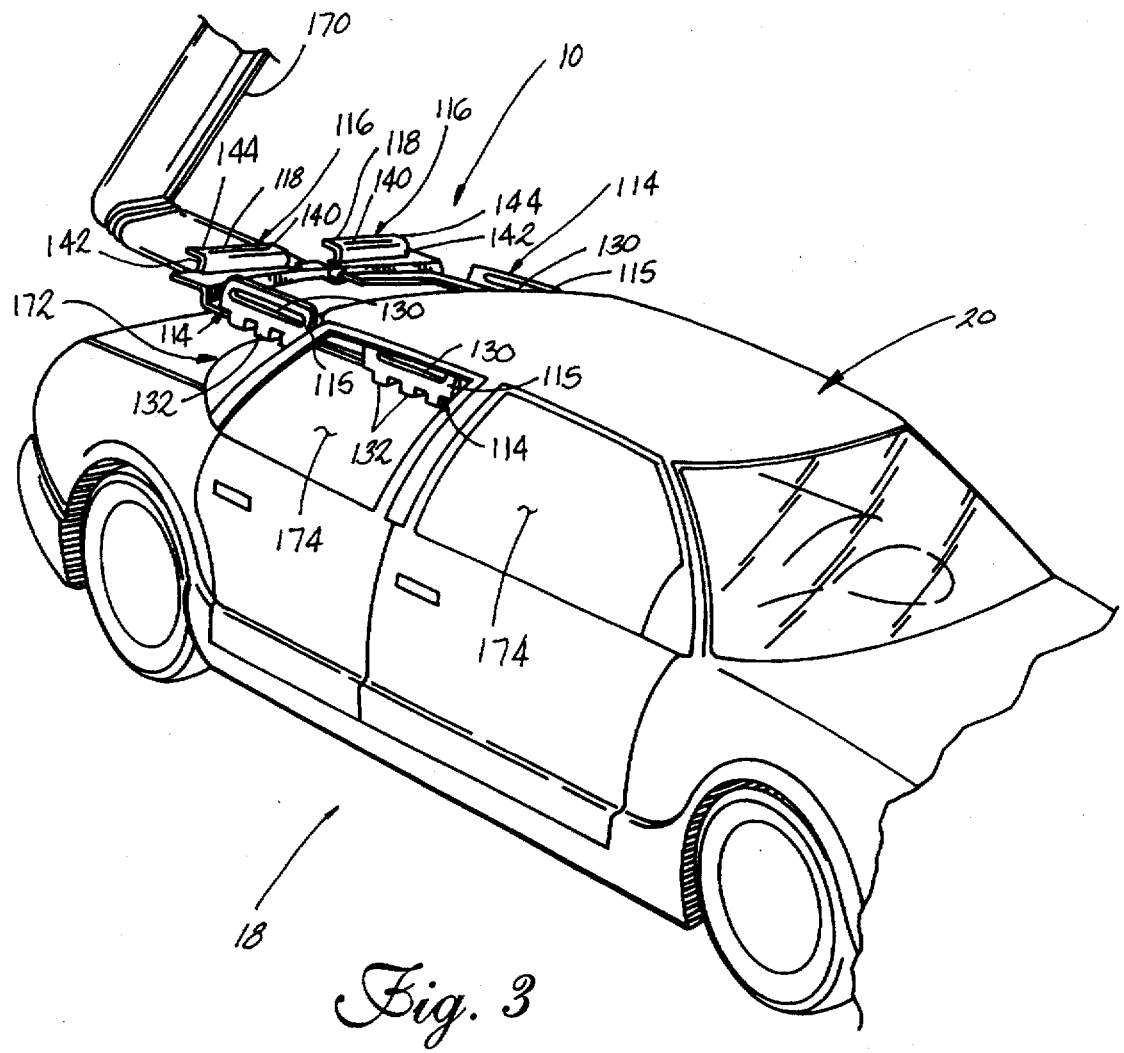
FIG. 3 is a perspective view of the modular headliner of FIG. 1 illustrating a method of installing the headliner into a motor vehicle according to the invention.
Figure 4:
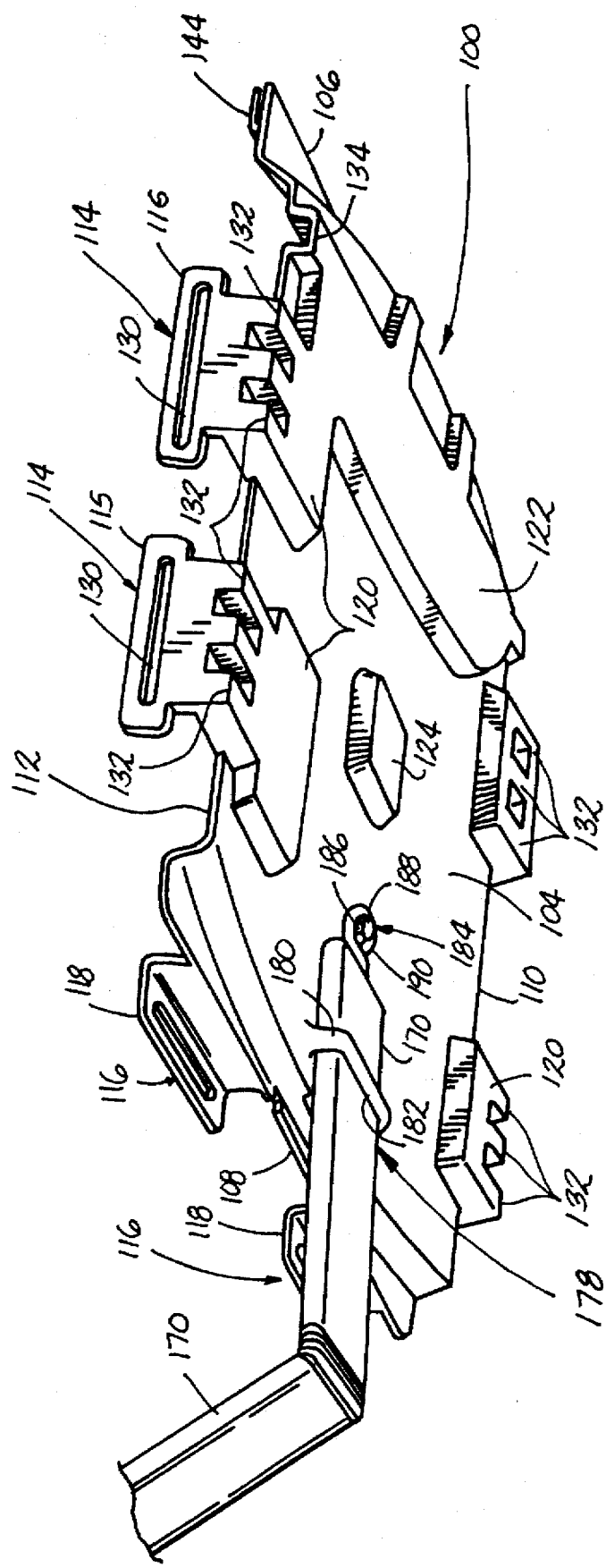
FIG. 4 is a bottom plan view of the support tray for the modular headliner of FIG. 1.

Referring to FIG. 4, a coupling assembly 178 is disposed on the lower surface 104 of the support tray 100 to aid in the moving of the support tray 100 and the installation of the headliner 30. Preferably, the coupling assembly 178 is adapted to couple with a robotic arm 170 (FIG. 3 and shown in phantom in FIG. 4). Although there are many suitable couplings, one suitable coupling assembly comprises a bracket 180 defining a channel 182 and a lug 184 having a stem 186 and cap 188. The bracket 180 and lug 184 can be formed within the tray 100 or mounted to the tray 100. The robotic arm 170 passes through the channel 182 and has a gripper 190 that grips the lug 184 to couple the robotic arm 170 to the support tray 100. Preferably, the bracket 180 and lug 184 are used in combination but they can be used individually to couple the robotic arm 170 to the tray 100.

Figure 2:
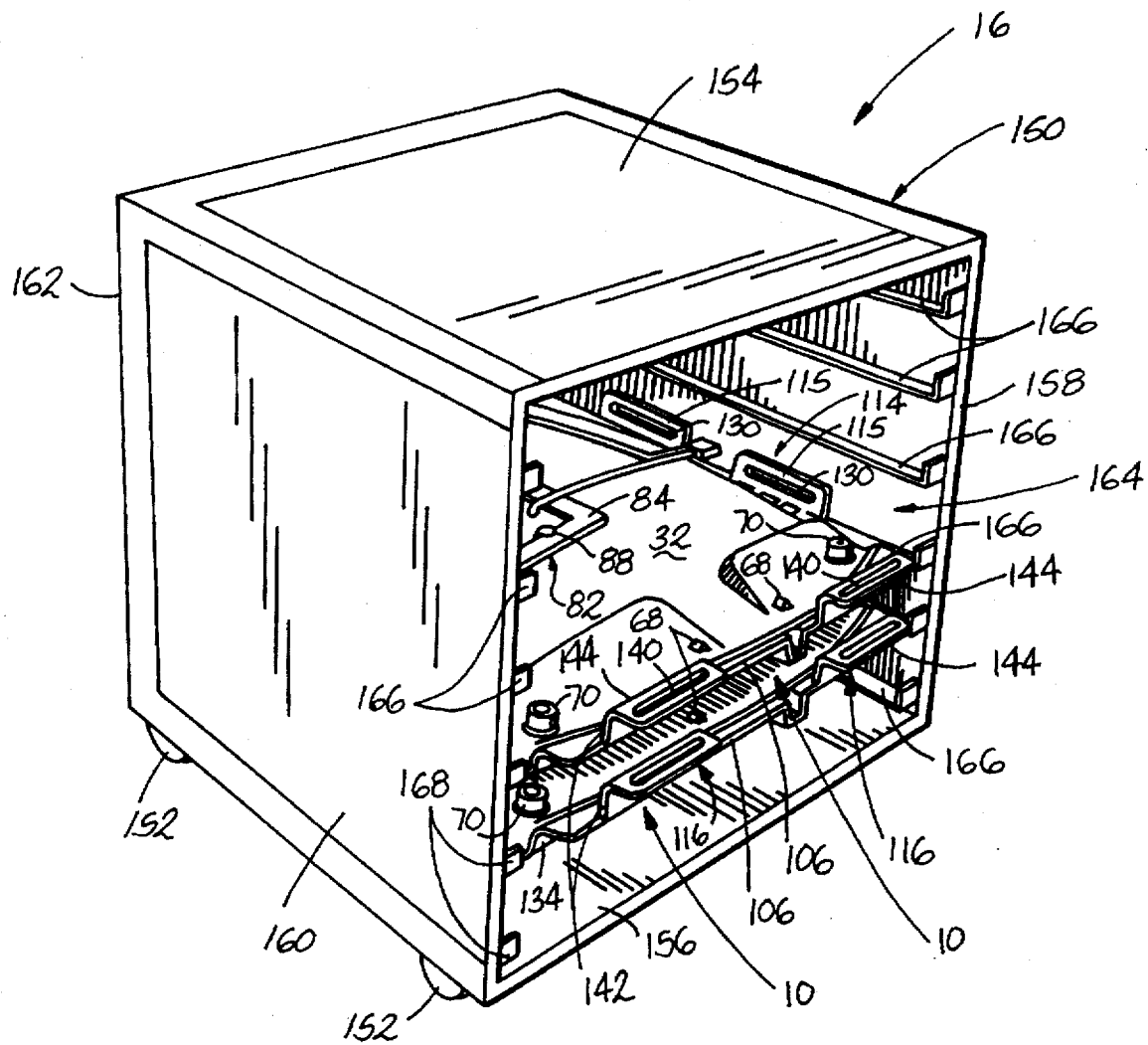
FIG. 2 is a perspective view of the modular headliner of FIG. 1 disposed within a shipping container in accordance with the invention.

Referring to FIG. 2, the carrier assembly 16 comprises a container 150 to which is pivotally mounted wheels 152 for rolling the container 150. The container 150 comprises a top wall 154, bottom wall 156, side walls 158, 160, and back wall 162 to define a headliner chamber 164. The headliner chamber 164 receives the headliners 30 mounted on the trays 100. The headliner chamber 164 can be sealed by a panel (not shown) and has a plurality of rails 166 disposed on the side walls 158, 160. The rails 166 are mounted to the opposing side walls 158 and 160. Each rail 166 has a stop 168 that abuts the tray 100 to prohibit the accidental removal of the tray 100 from the container 150.

The carrier assembly 16 can take many forms other than the container 150 shown in the drawings. It can be a simple wire rack with open sides, top and bottom. Alternatively, the trays can have supports for nesting and stacking of trays so that the trays and headliners can simply be stacked one on top of another and shipped without any carrier other than a releasable fastener to hold the trays together.

Figure 5:
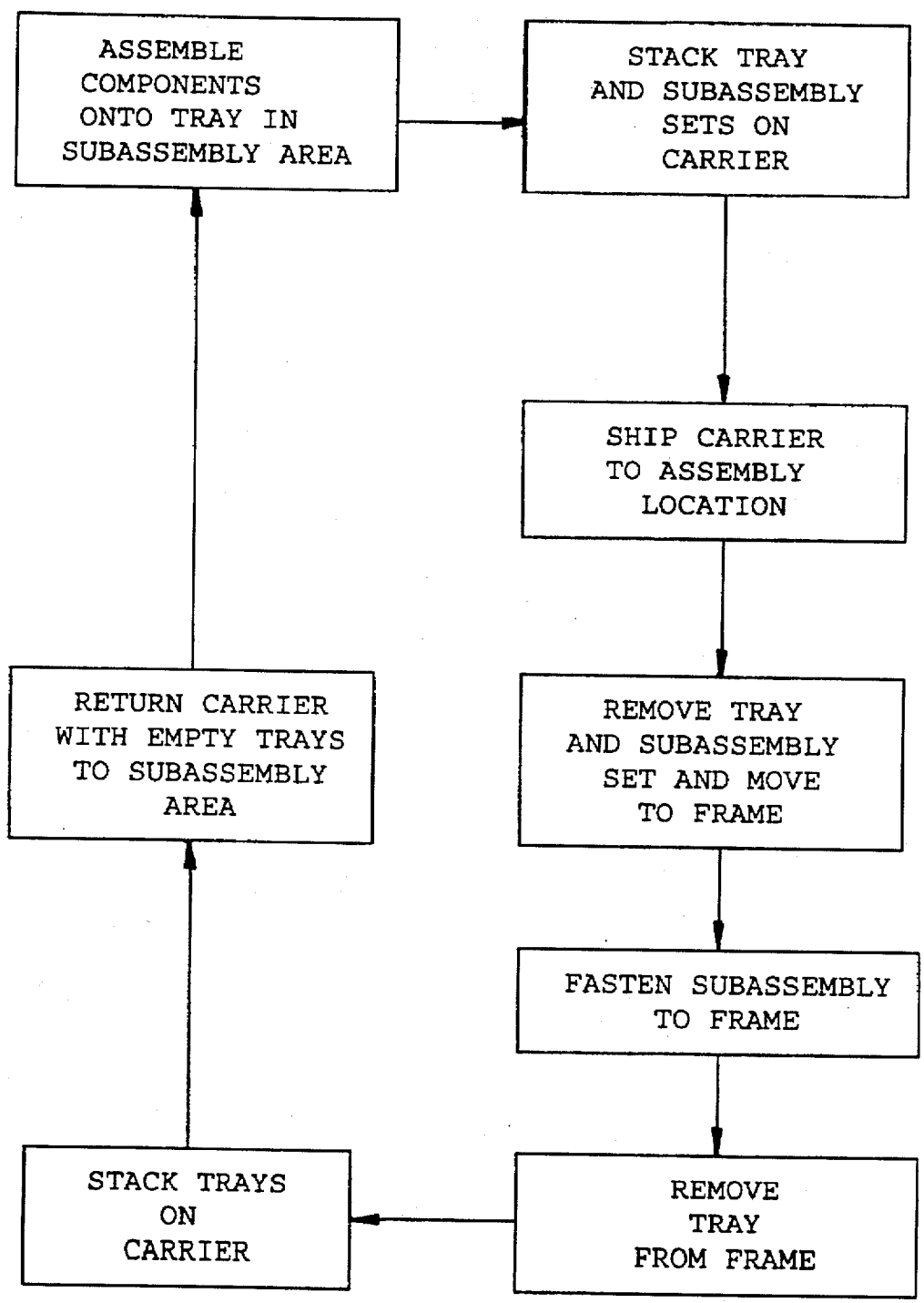
FIG. 5 is a schematic flow chart of a method according to the invention.

In operation, the accessories of the headliner 30, such as the grab handles 50, visors 60 and light assembly 80, are mounted to or formed within the headliner 30 at the headliner manufacturing plant. The headliner assembly 12 is then placed on the upper surface 102 of the tray 100 so that the accessories fit within the accessory recesses. Alternatively, the accessories can be first assembled on the tray and the headliner then placed on the tray. With reference to FIG. 5, the components of the headliner are assembled onto a tray at the subassembly area. The headliner assemblies 12 and their corresponding trays 100 are placed into the container 150 by sliding the tray 100 between the rails 166 so that the locator blocks 132 and tray blocks 134 rest on corresponding pairs of rails 166 behind the stops 168. Preferably, the rails 166 are spaced a sufficient distance so that the blocks 132 can rest on the rails 166 on opposing sidewalls 158, 160. The rails 166 are spaced on the sidewalls 158, 160 a sufficient distance so that the locators 114 do not interfere with the other rails 166. The handles 115 of the locators 114 and the handles 118 of the handles 116 can be used to aid the insertion of the combined headliner 30 and tray 100 into the container 150.

The combined headliners 30 and trays 100 are inserted into the container 150 until the container 150 is full or until the desired number of trays are loaded. With reference to FIG. 5, the tray and subassembly sets are stacked on the carrier. One or more of the containers 150 are loaded into a vehicle or other type of transportation. The containers can be rolled to the vehicle by pushing the containers on the wheels 152. Once the vehicle is loaded with the containers 150, the containers 150 are delivered to the vehicle manufacturing plant where they are unloaded. With reference to FIG. 5, the carrier is shipped to the assembly location. The containers 150 are brought to the appropriate assembly location within the automobile manufacturing plant. The headliners 30 with their trays 100 are removed seriatim from the container 150 and installed in the vehicle 18. Referring to FIG. 3, the trays 100 can be removed and installed by human labor, by manually operated mechanical arms or by robots. Preferably, a robotic arm or other mechanical arm 170 is coupled to the coupling assembly of the tray 100 as previously described and removes the tray 100 from the container 150. The robotic arm 170 then moves the tray 100 to the vehicle 18 where the headliner 30 is mounted to the roof 20 of the vehicle 18. With reference to FIG. 5, the tray and subassembly set is removed as a unit from the carrier and moved to the frame.

In the illustrated embodiment, the robotic arm 170 inserts the tray 100 with the headliner 30 through a rear window opening 172 of the vehicle until the tray 100 is disposed completely within the passenger compartment of the vehicle 18. The locators 114 are used to align the tray 100 with respect to the vehicle 18. The locators 114 will extend out the window openings 174 of the vehicle so that the tray 100 is properly located with respect to the roof 20 of the vehicle 18. The handles 115 and 118 can be used to help adjust the position of the tray 100 with respect to the roof 20. Once the tray 100 is in the proper position, the robotic arm 170 moves the tray 100 upwardly and the clips 52 are inserted into corresponding slots in the roof of the vehicle to secure the headliner to the vehicle roof 20. The clips can be inserted manually or with robots. Alternatively, or in addition to the clips 52, screws can be used to secure the accessories and headliner to the vehicle roof. With reference to FIG. 5, the subassembly is fastened to the frame.

After the headliner 30 is secured to the roof 20 of the vehicle 18, the tray 100 is lowered and removed from the vehicle 18 by the robotic arm 170 and placed back into the container 150 for subsequent shipment to the headliner manufacturing plant where the tray 100 is loaded with another headliner 30 and the process is repeated. With reference to FIG. 5, the tray is removed from the frame, stacked on the carrier and the carrier with the trays is returned to the subassembly area.

The invention has been described with respect to a tray 14 which is substantially solid in structure. The tray can be open in one or more areas to provide support for the headliner and accessories and yet provide access to fasteners in accessory areas. The tray can be a wire form configuration or molded as shown in the drawing. The trays further can have lugs for stacking and nesting so that the trays can be assembled on skids without the use of any carrier other than the skid and perhaps a fastener to maintain the trays in stacked condition on the skid.

The invention has also been described with respect to the assembly of headliners in a supplier plant and shipping of the headliners to an assembly plant for installation in an automobile. The invention can be used for the assembly of automotive parts other than headliners. For example, door panels, deck panels, dash panels and the like can be assembled on a tray in accordance with the invention and installed in an automobile with the assistance of the tray. The invention can further be used for assembly kits which are assembled at a supplier and shipped to an assembly plant for installation in a vehicle.

The invention has further been described with respect to the assembly of headliners in a supplier plant and the shipment to an assembly plant. The invention can be used for assembly of various parts entirely within an assembly plant. Assembly of the headliners or other panels need not take place in a supplier plant.

The invention has further been described with respect to headliners and trays which are oriented horizontally in a carrier. Whereas horizontal orientation is the preferred orientation, the invention is not so limited. It is possible to orient the trays at an angle to the horizontal for economy purposes, even up to 90° with respect to the horizontal.

Finally, the invention, although applicable especially to the assembly of automotive panels into a vehicle, can be used in other assembly plants where similar panel assemblies are installed. For example, the invention can be used in furniture plants in the making of furniture panels or in aircraft plants in the assembly of panels to an aircraft frame.

The invention advantageously protects the headliner during shipment and installation so that any structural members or reinforced areas to support the weight of the headliner are not required. The headliner is generally horizontally supported by the tray 100 over a wide surface during shipment and installation of the headliner within the vehicle. Furthermore, the invention provides a simple and inexpensive method for manufacturing and installing headliners in a vehicle. The fragile headliner can advantageously be shipped in a horizontal condition to minimize potential damage to the headliner. Further, the use of the tray facilitates the assembly of a modular headliner at the headliner factory for shipment intact and final fastening to the vehicle at the vehicle assembly plant. The horizontal tray tends to hold the accessories, i.e., grab handles, lighters, etc., in place during shipment and until final assembly.

Reasonable variation and modification are possible within the scope of the foregoing disclosure and drawings without departing from the spirit of the invention.

The embodiments of the invention in which an exclusive property or privilege is claimed are defined as follows:

1. A system for transporting and installing headliners into a vehicle, the system comprising:

a plurality of modular headliner and support assemblies, each support assembly comprising:
a modular headliner comprising a sheet of deformable material adapted to be mounted beneath a roof of a vehicle, the sheet has an upper surface adapted to face a roof of a vehicle and a lower contoured surface adapted to face an interior of a vehicle when the headliner is mounted in a vehicle, the sheet further has at least one slot to accommodate an accessory fastener;
at least one accessory for mounting to a vehicle roof; and
a support Way comprising an upper contoured surface shaped to substantially complement and support the lower contoured surface of the headliner for aligning the headliner with respect to the support tray and for protecting the headliner during transport and further shaped to complement the shape of the at least one accessory;
the modular headliner and the at least one accessory are positioned on the tray with the at least one accessory between the headliner and tray and in the vicinity of the at least one slot in the headliner; and
a carrier including a plurality of supports holding the plurality of modular headliner and support assemblies in a prearranged orientation, such that the plurality of assemblies can be transported in the prearranged orientation;
whereby a plurality of said modular headliner and support assemblies can be assembled at a location remote from a vehicle assembly station, loaded in carrier in the pre-arranged orientation, and transported to the vehicle assembly station, wherein one of the modular headliners with the at least one accessory can be installed in a vehicle by removing one of the assemblies from the carder, inserting the assembly into the vehicle as a unit, securing the headliner and the at least one accessory to the vehicle roof, and subsequently removing the support tray from the vehicle.

2. A system according to claim 1 wherein the carrier comprises a three-dimensional container defining a chamber for receiving the modular headliner and support assemblies.

3. A system according to claim 1 wherein the carrier further comprises rails on opposed sides for supporting the modular headliner and support assemblies for sliding movement into and out of the carrier chamber in a substantially horizontal orientation.

4. A system according to claim 1 wherein the support tray has sides and locators at the sides of the support tray for locating the support tray with respect to the vehicle for proper positioning of the headliner within the vehicle and for retaining the headliner in the tray during shipment.

5. A system according to claim 4 wherein the upper surface of the tray has a recess for receiving the at least one accessory for retaining the at least one accessory in the tray during shipment.

6. A system according to claim 5 wherein the tray has handles at the periphery of the support tray for lifting and moving the support tray.

7. A system according to claim 1 wherein the upper surface of the tray has at least one recess for receiving the at least one accessory for retaining the at least one accessory in the tray during shipment; and the tray further has an opening in the at least one recess; and further comprising a fastener accessible through the opening in the at least one recess to fasten the at least one accessory to the roof of the vehicle when the tray, the at least one accessory and the headliner are positioned in the vehicle.

8. A system according to claim 1 wherein the tray has handles at the periphery of the support tray for lifting and moving the support tray.

9. A system according to claim 1 and further comprising a coupling on a bottom surface of the support tray to connect the support tray to a mechanical arm for assembling the headliner to a vehicle.

10. A modular panel and support tray assembly comprising:

a modular panel formed of a sheet of deformable material adapted to be mounted to a structural frame, the sheet having an upper surface adapted to face a portion of the structural frame and a lower contoured surface adapted to face away from the portion of the structural frame when the modular panel is mounted to the structural frame, the sheet further has at least one slot to accommodate an accessory fastener;

at least one accessory having an accessory fastener for mounting to a structural frame; and a support tray comprising an upper contoured surface shaped to substantially complement and support the lower contoured surface of the sheet for aligning the sheet with respect to the support tray and for protecting the sheet during shipping and further shaped to complement the shape of the at least one accessory, the support tray has edges and at least one locator extending from at least one of the edges of the support tray for locating the support tray with respect to the vehicle for proper positioning of the headliner within the vehicle and for retaining the headliner in the tray during shipment;

the modular panel and the at least one accessory are positioned on the tray with the at least one accessory positioned between the modular panel and the tray with the accessory fastener extending through the at least one slot in the modular panel; and whereby the modular panel and the at least one accessory can be mounted to the frame by moving the modular panel, the at least one accessory, and support tray to and against the structural frame as a unit, securing the modular panel and the at least one accessory to the structural frame and subsequently removing the support tray from the structural frame.

11. A modular panel and support tray assembly according to claim 10 in combination with a carrier, the carrier having supports for holding multiple sets of modular panel and support tray assemblies in a prearranged orientation, wherein multiple sets of modular panel and support tray assemblies can be transported in the prearranged orientation.

12. A modular panel and support tray assembly according to claim 10 wherein the tray has in the upper surface thereof at least one integral recess formed continuously as a portion of the upper surface and in which the at least one accessory is received and the tray further has an opening in the at least one recess; and the accessory fastener is accessible through the opening in the at least one recess to fasten the at least one accessory to the structural frame when the tray, the modular panel and the at east one accessory are positioned against the structural frame.

13. A system according to claim 1 wherein the at least one accessory has a fastener which is positioned in the at least one slot in said headliner.

14. A system according to claim 1 wherein the at least one accessory includes a plurality of accessories, and the support tray upper surface is shaped to complement the shape of and support each of the accessories.

15. A system according to claim 14 wherein the upper surface of the tray has a plurality of recesses for receiving the plurality of accessories for retaining the accessories in the way during shipment and each of said recesses has an access opening extending through the tray for assembly of the accessories to the vehicle roof.

16. A system according to claim 1 wherein at least one locator is positioned on the support tray for locating the support tray with respect to the vehicle for proper positioning of the headliner within the vehicle and portions of the locator locate the headliner and support assembly in the carrier during shipment.

17. The system of claim 1 wherein the at least one accessory is pre-installed to the modular headliner in a position accessible from the lower surface of the headliner before the headliner is installed in a vehicle.

18. The modular headliner and support assembly of claim 17, wherein the at least one pre-installed accessory includes at least one sun visor bracket pre-installed on the headliner.

19. A modular panel and support tray assembly comprising:

a modular panel formed of a sheet of deformable material adapted to be mounted to a structural frame, the sheet having an upper surface adapted to face a portion of the structural frame and a lower contoured surface adapted to face away from the portion of the structural frame when the modular panel is mounted to the structural frame, the sheet further has at least one slot to accommodate an accessory fastener;

at least one accessory for mounting to a structural frame; and a support tray comprising an upper contoured surface shaped to substanially complement and support the lower contoured surface of the sheet for aligning the sheet with respect to the support tray and for protecting the sheet during transport and further having at least one integral recess that is formed continuously as a portion of the upper surface, the recess being shaped to complement the shape of the at accessory;

the modular panel is positioned on the tray and the at least one accessory is positioned in the at least one recess between the modular panel and the tray in the vicinity of the at least one slot in the modular panel; and whereby the modular panel and the at least one accessory can be mounted to the flame by moving the modular panel, the at least one accessory, and support tray to and against the structural frame as a unit, securing the modular panel and the at least one accessory to the structural frame and subsequently removing the support tray from the structural frame.

* * * * *

UNITED STATES PATENT AND TRADEMARK OFFICE
CERTIFICATE OF CORRECTION

PATENT NO.:     5,688,022

DATED:          Nov. 18, 1997

INVENTOR(S):    EDWARD R. ADAMS AND DOUGLAS C. RUCH

It is certified that error appears in the above-identified patent and that said Letters Patent is hereby corrected as shown below:

Col. 8, line 24, "Way" should be "tray"
Col. 8, line 42, "in carrier" should be "in the carrier"
Col. 8, line 47, "carder" should be "carrier"
Col. 9, line 65, "the lipper" should be "the upper"
Col. 10, line 4, "at east one" should be "at least one"
Col. 10, line 17, "way" should be "tray"
Col. 10, line 53, "at accessory" should be "at least one accessory"
Col. 10, line 59, "flame" should be "frame"

Signed and Sealed this

Nineteenth Day of May, 1998

Attest:

BRUCE LEHMAN

Attesting Officer

Commissioner of Patents and Trademarks